(12) United States Patent
Toyota et al.

(10) Patent No.: US 7,069,300 B2
(45) Date of Patent: Jun. 27, 2006

(54) COMMUNITY-BASED COLLABORATIVE KNOWLEDGE SYSTEM, AND MESSAGE MOVING METHOD IN THAT SYSTEM

(75) Inventors: Mayo Toyota, Ome (JP); Hitoshi Tanigawa, Higashiyamato (JP); Masaaki Iwata, Ome (JP); Kazunori Shimakawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 624 days.

(21) Appl. No.: 10/084,307

(22) Filed: Feb. 28, 2002

(65) Prior Publication Data

US 2003/0014482 A1 Jan. 16, 2003

(30) Foreign Application Priority Data

Jul. 16, 2001 (JP) ............... 2001-215916

(51) Int. Cl.
    G06F 15/16 (2006.01)
(52) U.S. Cl. .................................. 709/206
(58) Field of Classification Search ........... 709/203, 709/206, 223; 707/2, 10, 102
    See application file for complete search history.

(56) References Cited

U.S. PATENT DOCUMENTS

| | | | | |
|---|---|---|---|---|
| 5,867,799 A | * | 2/1999 | Lang et al. ............... | 707/1 |
| 6,289,348 B1 | * | 9/2001 | Richard et al. ........... | 707/10 |
| 6,515,681 B1 | * | 2/2003 | Knight ..................... | 715/751 |
| 6,571,234 B1 | * | 5/2003 | Knight et al. ............ | 707/3 |
| 6,578,025 B1 | * | 6/2003 | Pollack et al. ........... | 707/2 |
| 6,721,748 B1 | * | 4/2004 | Knight et al. ............ | 707/10 |
| 6,778,982 B1 | * | 8/2004 | Knight et al. ............ | 707/3 |
| 6,804,675 B1 | * | 10/2004 | Knight et al. ........... | 707/10 |
| 6,859,807 B1 | * | 2/2005 | Knight et al. ........... | 707/10 |
| 2003/0005067 A1 | * | 1/2003 | Martin et al. ............ | 709/207 |
| 2003/0014482 A1 | * | 1/2003 | Toyota et al. ........... | 709/203 |

FOREIGN PATENT DOCUMENTS

JP 2000-123033 4/2000

OTHER PUBLICATIONS

Hideo Umeki et al.; "Platform for Community-Based Collaborative Knowledge Creation"; Toshiba Review, vol. 56, No. 5, pp. 14-18, May 2001.

* cited by examiner

Primary Examiner—Andrew Caldwell
Assistant Examiner—Stephan Willett
(74) Attorney, Agent, or Firm—Finnegan, Henderson, Farabow, Garrett & Dunner, L.L.P.

(57) ABSTRACT

A community server categorizes and accumulates messages exchanged by users on a virtual community for respective topics. Since the community server includes a thread moving unit, i.e., a mechanism that allows an administrator to move a thread as a set of messages posted to a given virtual community to another virtual community, each user can utilize collected and accumulated knowledge via his or her desired interface. Since the administrator can move a thread between communities, virtual communities can be combined or divided.

15 Claims, 12 Drawing Sheets

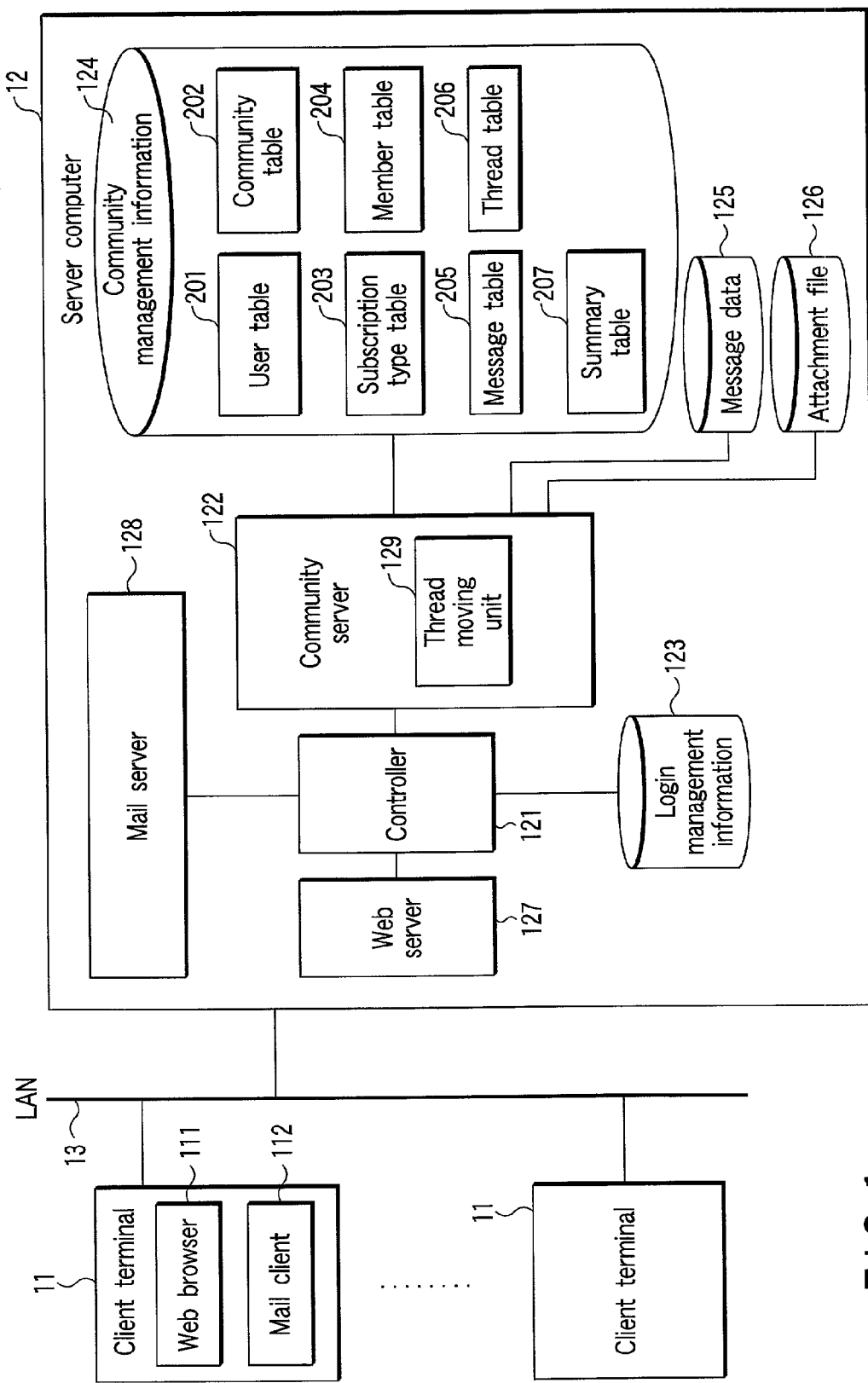
F I G. 1

User table

| User ID | User name | Mail address |
|---|---|---|
| U00001 | Ichiro Tanaka | ichiro.tanaka@xxxx.co.jp |
| U00002 | Taro Yamada | taro.yamada@xxxx.co.jp |
| U00003 | Jiro Saito | jiro.saito@xxxx.co.jp |
| ... | ... | ... |

F I G. 6

Community table

| Community ID | Community name | Community type | Administrator ID list | Member ID list |
|---|---|---|---|---|
| C001 | Community A | Open | M000001 | M000001,M000004,M000005.... |
| C002 | Community B | Membership | M000020,M000030.... | M000002,M000003.... |
| ... | ... | ... | ... | ... |

Subscription type table

| User ID | User name | Community ID | Subscription type | Mail address |
|---|---|---|---|---|
| U00001 | Ichiro Tanaka | C001 | Web | ichiro.tanaka@xxx.co.jp |
| U00001 | Ichiro Tanaka | C002 | Mail | |
| U00002 | Taro Yamada | C005 | Web | |
| U00003 | Jiro Saito | C001 | Web | |
| ... | ... | ... | ... | |

F I G. 8

Member table

| Member ID | Member type | User name |
|---|---|---|
| M000001 | Member | Ichiro Tanaka |
| M000002 | Temporary registered member | Taro Yamada |
| M000003 | Intending member | Ichiro Tanaka |
| M000004 | Anonymous | Taro Yamada |
| M000005 | Member | Jiro Saito |
| ... | ... | ... |

FIG. 9

Thread table

| Community ID | Thread ID list |
|---|---|
| C001 | T01001, T01002, ... |
| C002 | T02001, ... |
| ... | ... |

FIG. 10

Message table

| Thread ID | Message ID | Member ID | Message data (URL) |
|---|---|---|---|
| T01001 | G00000001 | M00000001 | XXXXXXXXXXXXXXXX |
| | G00000002 | M00000005 | YYYYYYYYYYYYYYYY |
| | ... | ... | ... |

Summary table

| Thread ID | Message ID | Member ID | Revision | Message data (URL) |
|---|---|---|---|---|
| T01001 | S00000001 | M00000005 | 1 | MMMMMMMMMMMMMMMM |
| | S00000002 | M00000001 | 2 | NNNNNNNNNNNNNNNN |
| | ... | ... | ... | ... |
| | S0000000n | M00000005 | n | PPPPPPPPPPPPPPPP |

Thread movement

| Community Name | Source | Destination | Moving method | |
|---|---|---|---|---|
| | | | Select ◄ Click | |
| Community A | ✓ | ☐ | Batch movement | ✓ |
| Community B | ☐ | ✓ | Partial movement | ☐ |
| Community C | ☐ | ☐ | | |
| ... | | | | |

FIG. 13A

Thread movement

Batch movement ◄ Click

| Selected | Thread ID | Thread title | Message count |
|---|---|---|---|
| ✓ | T01001 | KKKKKKKK | 3 |
| ✓ | T01002 | LLLLLLL | 6 |
| ✓ | T01003 | MMMM | 4 |
| | ... | | |
| ✓ | T0100n | ZZZZZZZZZ | 11 |

FIG. 13B

F I G. 14A
F I G. 14B

COMMUNITY-BASED COLLABORATIVE KNOWLEDGE SYSTEM, AND MESSAGE MOVING METHOD IN THAT SYSTEM

CROSS-REFERENCE TO RELATED APPLICATIONS

This application is based upon and claims the benefit of priority from the prior Japanese Patent Application No. 2001-215916, filed Jul. 16, 2001, the entire contents of which are incorporated herein by reference.

BACKGROUND OF THE INVENTION

1. Field of the Invention

The present invention relates to a community-based collaborative knowledge system used in a knowledge management system, and a message moving method in that system and, more particularly, to a community-based collaborative knowledge system that supports knowledge accumulation using a virtual community in which many unspecified users participate, and a message moving method for moving messages between virtual communities in that system.

2. Description of the Related Art

In recent years, an increasing number of enterprises are introducing groupware which are used to share information among a plurality of users. As typical groupware, an e-mail system, workflow system, and the like are known. Recently, a knowledge management system used to support knowledge and information sharing is beginning to be developed.

The knowledge management system accumulates and manages individual know-how as a knowledge database in addition to Web information and digital file information, and allows to efficiently use knowledge and information when it is combined with a search function (e.g., natural language search).

For such knowledge management system, how to collect and accumulate knowledge such as individual know-how is an important issue. Since knowledge such as individual know-how is so-called tacit knowledge, and does not have any predetermined format unlike Web information and digital file information, it is difficult to automatically collect and accumulate such knowledge.

Hence, the development of a knowledge management system having a community-based collaborative knowledge function is required recently. By implementing a mechanism for automatically collecting and accumulating knowledge such as individual know-how, tacit knowledge can be exploited like explicit knowledge such as Web information and digital file information.

However, since the conventional knowledge management system has a standardized user interface for utilizing collected and accumulated knowledge, some users are forced to utilize collected and accumulated knowledge via such interface in place of their favorite interfaces.

Also, since sets (threads) of discussion messages cannot be moved among electronic bulletin boards (virtual communities), the electronic bulletin boards (virtual communities) in which similar topics have been discussed cannot be combined or divided.

BRIEF SUMMARY OF THE INVENTION

It is an object of the present invention to provide a community-based collaborative knowledge system which can efficiently collect and accumulate knowledge such as individual know-how, and can easily combine and divide virtual communities as discussion sites, and a message moving method in that system.

In order to achieve the above object, according to the present invention, there is provided a community-based collaborative knowledge system which can be connected to a plurality of client terminals via a network, and supports knowledge accumulation by categorizing and accumulating messages posted from each client terminal to a virtual community, comprising access control means for making user authentication of a client terminal as an access request source so as to permit the client terminal to post a message, and community processing means for managing a plurality of virtual communities in each of which a plurality of client terminals can participate, and categorizing and accumulating messages posted, to each virtual community, from the client terminals, which are granted access permission by the access control means, for respective topics, the community processing means including message moving means for moving the categorized and accumulated messages between the virtual communities in accordance with an instruction from an administrator.

In this community-based collaborative knowledge system, messages exchanged among users on virtual communities are categorized and accumulated for respective topics, and individual knowledge contained in discussion made among a plurality of users can be automatically collected. Especially, since a mechanism for moving a thread as a set of messages posted to a given virtual community to another virtual community is provided, virtual communities in which related topics have been discussed can be combined, or a single virtual community can be divided into a plurality of groups for respective topics.

According to the present invention, since the mechanism for moving a thread as a set of messages posted to a given virtual community to another virtual community is provided, each user can utilize collected and accumulated knowledge via his or her desired interface. Since an administrator can move a thread between communities, virtual communities can be combined or divided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the system arrangement of a community-based collaborative knowledge system according to an embodiment of the present invention;

FIG. 6 shows an example of a user table used in the community-based collaborative knowledge system of this embodiment;

FIG. 7 shows an example of a community table used in the community-based collaborative knowledge system of this embodiment;

FIG. 8 shows an example of a subscription type table used in the community-based collaborative knowledge system of this embodiment;

FIG. 9 shows an example of a member table used in the community-based collaborative knowledge system of this embodiment;

FIG. 10 shows an example of a thread table used in the community-based collaborative knowledge system of this embodiment;

FIG. 11 shows an example of a message table used in the community-based collaborative knowledge system of this embodiment;

FIG. 12 shows an example of a summary table used in the community-based collaborative knowledge system of this embodiment;

FIGS. 13A and 13B are first views showing state transition of Web browser window contents upon moving a thread between communities on an administrator window in the community-based collaborative knowledge system of this embodiment;

FIGS. 14A and 14B are second views showing state transition of Web browser window contents upon moving a thread between communities on an administrator window in the community-based collaborative knowledge system of this embodiment;

DETAILED DESCRIPTION OF THE INVENTION

A preferred embodiment of the present invention will be described hereinafter with reference to the accompanying drawings.

FIG. 1 shows the arrangement of a community-based collaborative knowledge system according to an embodiment of the present invention. This community-based collaborative knowledge system is used as a knowledge management system having a community-based collaborative knowledge function, and categorizes and accumulates knowledge using a virtual community to which a plurality of client terminals 11 can commonly access. Prior to a detailed description of the arrangement, an outline of the community-based collaborative knowledge system according to this embodiment will be explained first using FIGS. 2 to 5.

Figure 2:
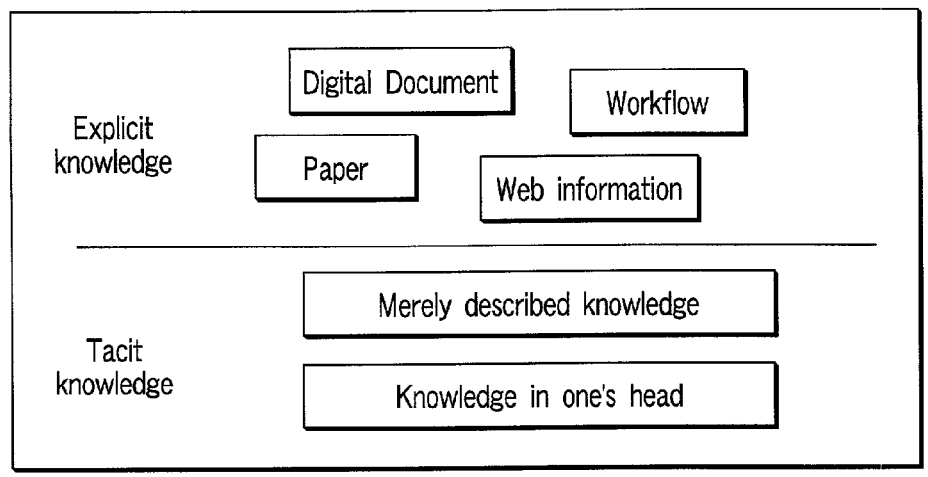
FIG. 2 is a view for explaining knowledge processed by the community-based collaborative knowledge system of this embodiment.

As shown in FIG. 2, there are two kinds of knowledge, i.e., "explicit knowledge" and "tacit knowledge". Nowadays, arrangement and management systems such as a document management system, Web server, and the like for explicit information (explicit knowledge) have nearly reached a point of maturity. However, in practice, these systems cannot support all aspects of "accumulation of knowledge". This is because there exists very indefinitive information such as casual conversation exchanged via mail messages, knowledge only in one's head, and the like. Such information is called "tacit knowledge". How to process and share such tacit knowledge is an important issue. It is difficult for a conventional system to support accumulation of tacit knowledge, and a system that can process tacit knowledge is required.

A community-based collaborative knowledge system of this embodiment is a tool which converts such information called tacit knowledge into explicit knowledge, and aims at promoting knowledge accumulation, allows discussions in a group in a virtual community having an electronic bulletin board format, and categorizes and accumulates messages (posted articles) for respective topics. Also, this system can generate a summary of one topic (to be referred to as a thread hereinafter). The thread means a bundle of given related knowledge on the virtual community. The summary is a message having a role of a kind of proceeding that summarizes the discussions in the group, and can be generated for each individual thread.

Figure 3:
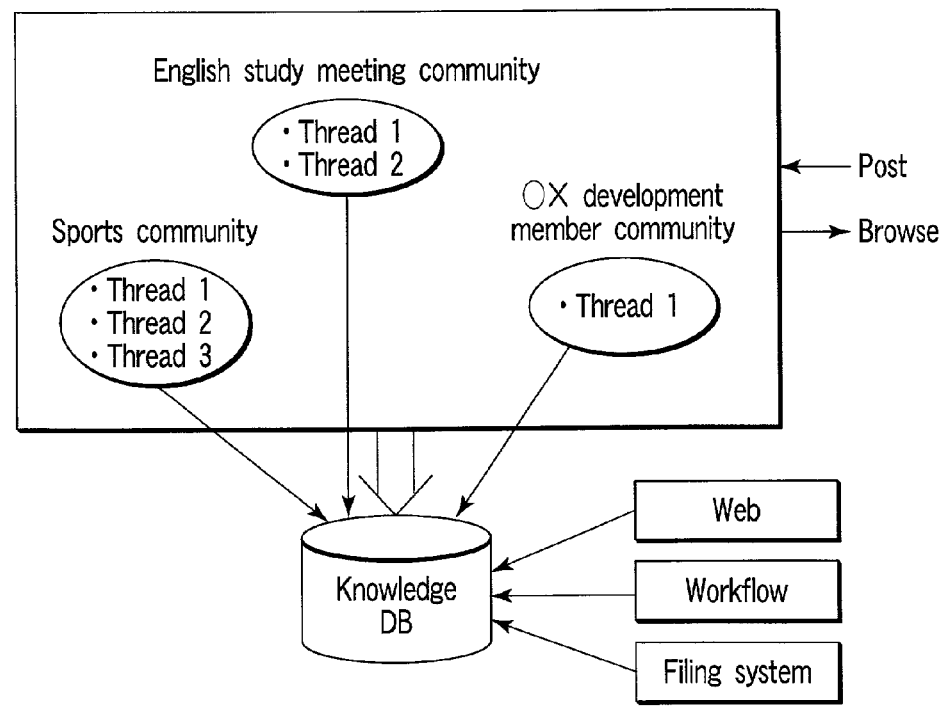
FIG. 3 is a view for explaining a knowledge accumulation process in the community-based collaborative knowledge system of this embodiment.

A message is posted via an e-mail message or by input from a Web browser, and posted messages are saved in a server which forms the community-based collaborative knowledge system. In this community-based collaborative knowledge system, a message can also be posted using an e-mail message, and has a function as a mailing list. When respective users communicate with each other via mail messages, tacit knowledge is accumulated unconsciously. FIG. 3 shows this state.

FIG. 3 shows "sports community" as a virtual community associated with sports, "English study meeting community" as a virtual community associated with an English study meeting, and "○X development member community" as a virtual community of given development members. Messages posted by respective users are categorized and accumulated for these virtual communities, and are categorized for respective threads in each virtual community. FIG. 3 shows a case wherein messages associated with three different topics, i.e., threads 1, 2, and 3 are currently accumulated in "sports community", messages associated with two different topics, i.e., threads 1 and 2 are accumulated in "English study meeting community", and messages associated with one topic, i.e., thread 1 are accumulated in "○X development member community". Messages posted to these virtual communities are accumulated as knowledge information in a knowledge database (knowledge DB) as well as other kinds of knowledge (explicit knowledge collected from webs, workflow, filing systems, and the like). Especially, when "summary" messages generated for respective threads are collected in the knowledge DB and are applied to full-text search, natural language search, and the like prior to other messages, the "flow of messages" as so-called flow information can be efficiently utilized as static stock information.

<Site>

In this specification, the server function of this community-based collaborative knowledge system is called a "site". An administrator is present in the site, and manages site information. The site information includes:

(1) User Information

This information is associated with users who can use the site.

The site administrator can register, delete, and change this information.

(2) Community Creation Authority Information

This information is authority information required upon creating a virtual community.

A virtual community is a kind of electronic bulletin board to which a plurality of users can commonly access to post and browse messages, and indicates a "site" where people who have the same objective communicate with each other. Each user accesses a community with a theme corresponding to his or her objective, and acquires desired knowledge or posts a message (article). Each community has at least one administrator (a community creator becomes a default administrator but this can be changed). The authority associated with creation of a community can be selected from the following two choices.

All the registered users can create a community.

Only the user who is authorized by the site administrator can create a community.

(3) Category Information of Community

This information is category information used to categorize communities.

The site administrator can register, delete, and change this information.

<Community>

A community will be explained below. Community information (property of a community) used to manage each community includes:

(1) Name

This indicates the name of community.

(2) Posting Mail Address

This address is a mail address assigned to each community. When the user sends a mail message to this address, its contents are automatically registered in the corresponding community as a new message.

(3) Subject Information of Received Mail

The user can participate in a community in two ways; either he or she can "subscribe via Web" or browse and post messages via a Web browser, or he or she can "subscribe via mail" or receive an automatic mail delivery service of new messages in addition to browsing and posting of messages via the Web browser. For a user who selected "subscribe via mail", when a new message is posted to a given community, that new message is automatically delivered as an e-mail message. In this case, Subject information of the delivered e-mail message is appended with "Subject information of received mail" (e.g., information such as {community name, message number}).

(4) Creator

This indicates the user name of the user who created a community.

(5) Date of Creation

This indicates the date of creation of a community.

(6) Introduction of Community

This indicates a simple introduction of a community.

(7) Category of Community

As described above, communities can be categorized according to their contents, and information associated with a category is held for each community. The category is registered by the site administrator.

(8) Community Type

The community type means the open level of a community. The open levels of communities include "open" that allows everyone to participate, "membership" for only a group of authorized members, and "closed" that is not open to the public other than authorized members.

(9) Statistic Information

This information includes the number of users who belong to each community, posting count ranking for respective members, and the like.

(10) Administrator

This indicates the name of an administrator who manages a given community.

(11) Member

This indicates users who belong to (can access) a given community.

(12) Message Delete Authority

This indicates a user who is authorized to delete a posted message. There are two choices:
community administrator alone
community administrator and poster <Message and Thread>

A message and thread will be described below.

A message is each of comments (posted articles) exchanged in discussion in a community. The message can be appended with a plurality of files. The message can be posted by input from a Web browser or by sending a mail message to the mail address of a given community.

On the other hand, a thread is a bundle of messages associated with a given topic. Discussion progresses via various opinions (messages) for one topic and reaches a conclusion. This conclusion is a "summary". This community-based collaborative knowledge system also has a creation support function associated with "summary". Using this creation support function, a "summary" as a conclusion of a given topic can be easily created while quoting messages, appended files, and the like in the corresponding thread.

Figure 4:
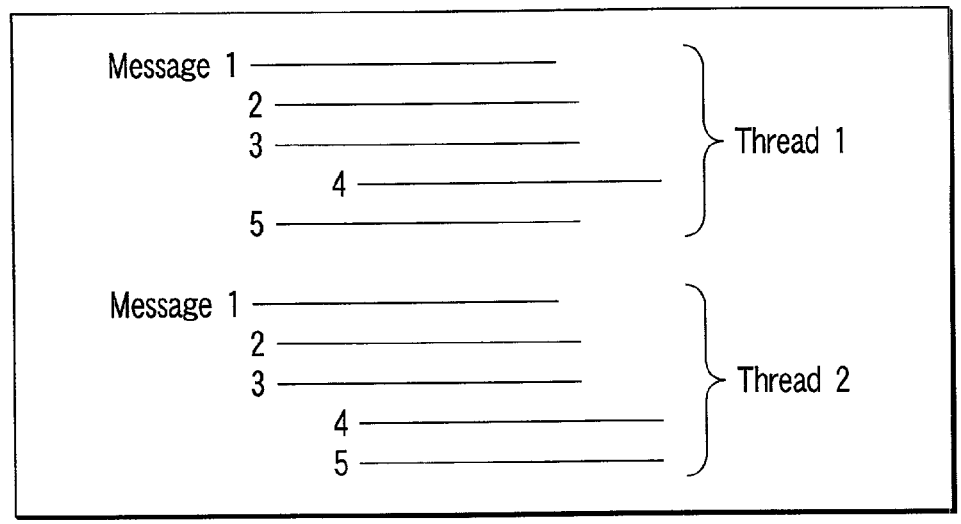
FIG. 4 is a view for explaining the relationship between messages and threads managed by the community-based collaborative knowledge system of this embodiment.

FIG. 4 shows an example of the hierarchical structure of messages which form a thread. Referring to FIG. 4, thread 1 contains five messages 1, 2, 3, 4, and 5. The structure of thread 1 corresponds to a case wherein message 1 was posted first, messages 2 and 3 were posted as reply (response) messages to message 1, message 4 was posted as a reply (response) message to message 3, and message 5 was further posted as a reply (response) message to message 1.

Thread 2 also contains five messages 1, 2, 3, 4, and 5. The structure of thread 2 corresponds to a case wherein messages 2 and 3 were posted as reply (response) messages to message 1 which was posted first, and messages 4 and 5 were posted as reply (response) messages to message 3.

When a message different from a reply to each message of threads 1 and 2 is newly posted to the same community as threads 1 and 2, thread 3 is assigned to that new message.

<Summary>

Figure 5:
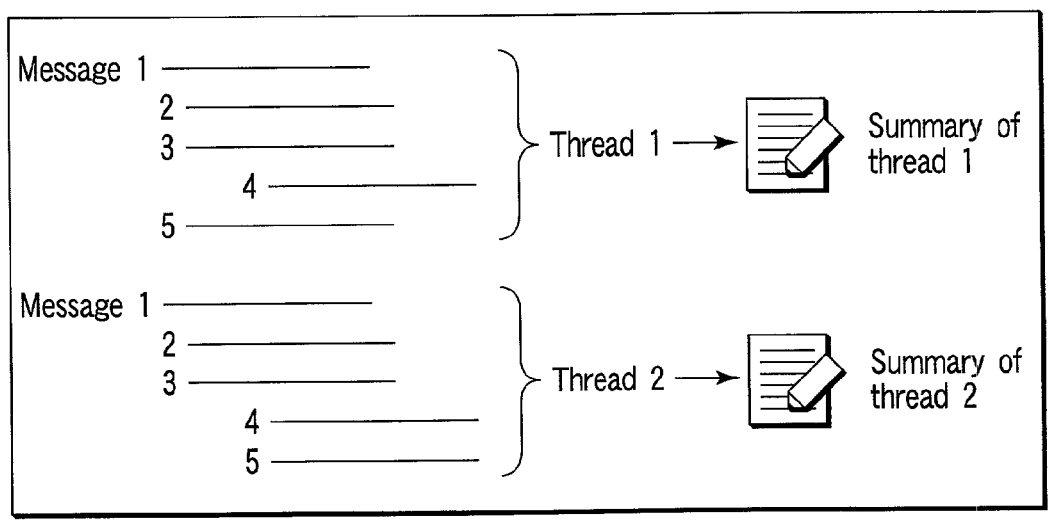
FIG. 5 is a view for explaining the relationship between messages and "summary" messages managed by the community-based collaborative knowledge system of this embodiment.

A "summary" is "conclusion" of discussion (thread). In other words, the "summary" corresponds to "proceeding" in, e.g., a business meeting, or corresponds to "specification" for review upon development. As shown in FIG. 5, one "summary" corresponds to one thread. That is, the user or administrator creates a "summary" as a conclusion for each thread, and manages it as a special form of messages which form the corresponding thread. The "summary" can be appended with a plurality of files as in normal messages.

The "summary" can be revised, and a new "summary" is created by, e.g., updating the already created "summary" and can be registered as the latest "summary".

<Message Posting by Mail>

A message posted to each community via a mail message is processed in the following sequence.

(1) A user posts a mail message to a mail address assigned to a community as a destination.

(2) The server of the community-based collaborative knowledge system simultaneously acquires mail messages to all communities from a mail server.

(3) The server of the community-based collaborative knowledge system checks the destinations of the messages based on their posting mail addresses and distributes them.

(4) The server of the community-based collaborative knowledge system determines a thread and layer of the corresponding community to which the message of interest is to be registered on the basis of header information (or title) of the acquired mail message, and registers text of the acquired mail message thereto as a message.

A message posted to each community as a mail message is automatically stored in the corresponding location by the aforementioned process. The user need only post a message as if he or she were posting a comment to a mailing list.

<Message Subscription Type>

A user who uses the community-based collaborative knowledge system can select one of two choices as the message subscription type, as described above.

subscribe via Web browser (the user accesses the URL (Uniform Resource Locator) of the community-based collaborative knowledge system)

subscribe via mail

The user can subscribe (can also post a message) via a Web browser independently of the subscription type of his or her choice. That is, the user can select whether or not a new message is automatically delivered to him or her when it is posted. If the user selects mail subscription, a message is delivered as a mail message. The user can post a reply message by only sending a reply to the delivered mail message. The user can select the subscription type for each community he or she belongs.

<System Arrangement>

The system arrangement of the community-based collaborative knowledge system according to this embodiment will be described below with reference to FIG. 1.

The community-based collaborative knowledge system of this embodiment is implemented by a server computer 12 which can be connected to a plurality of client terminals 11 via a computer network 13 such as a LAN or the like. Each of the server computer 12 and client terminals 11 has a CPU, a main memory, a magnetic disk device as a storage device, and input/output devices including an input unit such as a keyboard, mouse, and the like, and a display unit such as a display (none of them are shown).

On each client terminal 11, one or both of a Web browser 111 and mail client 112 run. Each user can use a community-based collaborative knowledge process from each client terminal 11 by designating the URL (Uniform Resource Locator) indicating the resource for the community-based collaborative knowledge system built on the server computer 12 from the Web browser 111 or sending a mail message from the mail client 112 to a mail address of each community managed by a community server 112.

The community-based collaborative knowledge function on the server computer 12 is implemented mainly by software programs of a controller 121, the community server 122, a Web server 127, a mail server 128, and the like, and management information and actual data used to post and browse messages by these software programs. The management information includes login management information (user ID+password) 123 used to authenticate the user of each client terminal 11, and community management information 124 used to manage each community. Also, the actual data include message data 125 and attachment files 126.

The controller 121 controls the overall operations associated with the community-based collaborative knowledge function, and has a mediation function between the community server 122 as a core program of this community-based collaborative knowledge system, and the Web server 127 and mail server 128, and also a user authentication function when each client terminal 11 logs into the community server 122 via the Web server 127 and mail server 128. For user authentication, the controller 121 manages the login management information 123. The login management information stores the user IDs, passwords, and the like of individual users who participate in the community-based collaborative knowledge system. With this user authentication, access from each client terminal 11 to the community server 122, which is made to, e.g., post a message, undergoes permission/denial control.

The community server 122 manages and runs communities in which a plurality of client terminals 11 can participate, and categorizes and accumulates messages posted by respective client terminals 11 for respective communities and topics (threads). The community server 122 manages and runs communities using the community management information 124, message data, and attachment files 126. That is, these community management information 124, message data, and attachment files 126 are used as a database for accumulating and manages messages for respective communities.

Furthermore, the community server 122 includes a thread moving unit 129. The thread moving unit 129 moves a thread between communities using the community management information 124, thus combining or dividing communities.

Tables which form the community management information 124 will be explained below.

As shown in FIG. 1, the community management information 124 is formed of a user table 201, community table 202, subscription type table 203, member table 204, thread table 205, message table 206, summary table 207, and the like. These tables will be explained below.

<User Table>

FIG. 6 shows an example of the structure of the user table 201 that manages the users. The user table 201 stores user IDs, user names, and mail addresses of users who participate in the community-based collaborative knowledge system of this embodiment. FIG. 6 exemplifies a case wherein a user who has the user ID "U00001", user name "Ichiro Tanaka", and mail address "ichiro.tanaka@xxxx.co.jp", a user who has the user ID "U00002", user name "Taro Yamada", and mail address "taro.yamada@xxxx.co.jp", and a user who has the user ID "U00003", user name "Jiro Saito", and mail address "jiro.saito@xxxx.co.jp" are registered.

<Community Table>

FIG. 7 shows an example of the structure of the community table 202 used to manage communities. The community table 202 is used to manage communities created on the community-based collaborative knowledge system of this embodiment and users who participate in respective communities, and stores the community IDs, community names, and community types of communities created on this community-based collaborative knowledge system, administrator ID lists as lists of member IDs of members who are administrators of communities (since administrators are also members of the communities), and the member ID lists of members who participate in these communities. Note that the member type of a user who can be an administrator is limited to "member". Details of member types will be described later.

In FIG. 7, a community with the community ID "C001" and community name "community A" has the community type "open", the administrator of this community is a user with the member ID "M000001", and users who are assigned the member IDs "M000001", "M000004", "M000005", . . . participate in this community. Also, a community with the community ID "C002" and community name "community B" has the community type "membership", the administrators of this community are users with member IDs "M000020", "M000030", . . . , and members who are assigned the member IDs "M000002", "M00003", . . . participate in this community. Note that the member IDs are unique throughout the communities, and each user is assigned member IDs, the number of which is equal to the number of communities he or she participates in.

<Subscription Type Table>

FIG. 8 shows an example of the structure of the subscription type table 203 used to manage the subscription types. The subscription type table 203 stores the user IDs and user names of users who participate in the community-based collaborative knowledge system of this embodiment, the community IDs of communities they participate in, subscription types to these communities, and users' mail addresses if the subscription type is "mail". When the user table 201 manages mail addresses, the mail addresses need not always be registered in the subscription type table 203. Conversely, the user table 201 may not manage any mail addresses, and the subscription type table 203 may manage the mail addresses of only users who selected the subscription type "mail".

FIG. 8 shows a case wherein the user who has the user ID "U00001" and user name "Ichiro Tanaka" participates in two communities with the community IDs "C001" and "C002", and selects the subscription type "Web" for the community with the community ID "C001" and the subscription type "mail" for the community with the community ID "C002"; the user who has the user ID "U00002" and user name "Taro Yamada" participates in a community with the community ID "C005", and selects the subscription type "Web" for that community; and the user who has the user ID "U00003" and user name "Jiro Saito" participates in a community with the community ID "C001", and selects the subscription type "Web" for that community.

<Member Table>

FIG. 9 shows an example of the structure of the member table 204 used to manage members. The member table 204 stores member types indicating participation attributes associated with communities they participate in, and the user names of users who participate in as members. The member types include "member" who has been authorized to participate, "temporary registered member" who is temporarily registered as a member, "intending member" who has applied to participate but has not been authorized to participate yet, and "anonymous" who does not take any participation procedure and participates in a community as a kind of guest. As described above, the user with the member type "member" can be an administrator of a community, but users of other member types are excluded from candidates of an administrator.

FIG. 9 shows a case wherein the user who has the user name "Ichiro Tanaka" has the member type "member" for a community in which he participates with the member ID "M000001", and the member type "intending member" for a community in which he participates with the member ID "M000003"; the user who has the user name "Taro Yamada" has the member type "temporary registered member" for a community in which he participates with the member ID "M000002", and the member type "anonymous" for a community in which he participates with the member ID "M000004"; and the user who has the user name "Jiro Saito" has the member type "member" for a community in which he participates with the member ID "M000005".

<Thread Table>

FIG. 10 shows an example of the structure of the thread table 205 used to manage threads. The thread table 205 stores the community IDs of communities, and thread ID lists each including the thread IDs of threads generated in a given community. The thread IDs use unique values throughout the communities.

FIG. 10 shows a case wherein a community with the community ID "C001" includes threads with thread IDs "T01001", "T01002", . . . ; and a community with the community ID "C002" includes threads with thread IDs "T02001".

<Message Table>

FIG. 11 shows an example of the structure of the message table 206 used to manage messages. The message tables 206 stores the message IDs of messages which form each individual thread, member IDs of posters who posted those messages, and the URLs of actual data of corresponding messages stored as the message data 125. Note that this URL may be uniquely specified by the corresponding thread ID and message ID and, in such case, the URL field may be omitted.

<Summary Table>

FIG. 12 shows an example of the structure of the summary table 207 used to manage "summary" messages created for respective threads. The summary table 207 stores the message IDs of messages posted as "summary" messages of a given thread, the member IDs of posters who posted those "summary" messages, the revision numbers of messages when a plurality of "summary" messages are created and registered, and URL information (message data URLs) indicating the locations of actual data of messages associated with the corresponding "summary" messages stored as the message data 125 in correspondence with each thread ID.

As in the message table 206, the URL of the summary table 207 may be uniquely specified by the corresponding thread ID and message ID and, in such case, the URL field may be omitted.

A thread moving process in this community-bas,ed collaborative knowledge system, which is executed by the thread moving unit 129 of the community server 122, will be described below.

An example of state transition of window contents displayed by the Web browser 111 of the client terminal 11 in the community-based collaborative knowledge system will be explained first with reference to FIGS. 13A and 13B.

FIGS. 13A and 13B show a thread moving access window displayed on the Web browser window of a community administrator (or site administrator) upon moving a thread. In FIG. 13A, a list of accessible communities, check boxes used to select the source and destination, and check boxes used to select "batch movement" or "partial movement" as a moving method are displayed. For example, when "community A" is designated as "source", "community B" is designated as "destination", "batch movement" is designated as the moving method, and "select button" is then clicked, a list of thread IDs, thread titles, and message counts of all threads in "community A" is displayed, and check boxes used to select individual threads are displayed in a selected state, as shown in FIG. 13B. In this state, when "batch movement button" is selected, the community server 122 executes a process for batch-moving all threads of "community A" to "community B" designated as the destination.

That is, movement instruction information indicating batch movement of all threads of "community A" to "community B" is sent from the client terminal 11 to the community server 122, and the thread moving unit 129 updates the community management information 124 based on that instruction. As a result, all threads stored so far in "community A" are stored in "community B". Also, "community A", all threads of which have been batch-moved, is automatically deleted.

When "community A" and "community C" are designated as "source", "community B" is designated as "destination", "batch movement" is designated as the moving method, and "select button" is then clicked in FIG. 13A, a list of all threads of "community A" and "community C" is displayed in a selected state in FIG. 13B. In this state, when "batch movement button" is selected, the community server 122 executes a process for batch-moving all threads of "community A" and "community C" to "community B" designated as the destination, and then deletes "community A" and "community C".

Note that the community may be deleted after confirmation of an administrator. Upon deleting a community, the community management information 124 is automatically updated so that the users who participate in that community as members can be those of the destination community.

An example of window contents transition upon selecting "partial movement" will be explained below with reference to FIGS. 14A and 14B.

FIGS. 14A and 14B show a thread moving access window displayed on the Web browser window of a community administrator (or site administrator) upon moving a thread. In FIG. 14A, a list of communities, check boxes used to select the source and destination, and check boxes used to select "batch movement" or "partial movement" as the moving method are displayed. When "community A" is designated as "source", "community B" is designated as "destination", "batch movement" is designated as the moving method, and "select button" is then clicked, a list of thread IDs, thread titles, and message counts of all threads in "community A" is displayed, and check boxes used to select individual threads are displayed, as shown in FIG. 14B. When threads to be moved are selected from these threads, and "partial movement button" is clicked, the community server 122 executes a process for moving the selected threads (threads "T01002" and "T01003" in this case) in "community A" to "community B" selected as the destination.

That is, movement instruction information indicating movement of some threads in "community A" to "community B" is sent from the client terminal 11 to the community server 122, and the thread moving unit 129 updates the community management information 124 based on that instruction. As a result, some of threads stored so far in "community A" are stored in "community B". In such partial movement, the source community "community A" is not deleted. Hence, when "partial movement" is done while designating a newly created community as the destination, the source community can be divided into two communities.

In case of "partial movement", when "partial movement" is done while designating a plurality of newly created communities as the destinations, the source community can be divided into a plurality of communities. Furthermore, when a plurality of source communities are designated as in "batch movement", threads to be moved can be arbitrarily selected from those of these plurality of source communities, and can be moved to the destination community.

Figure 15:
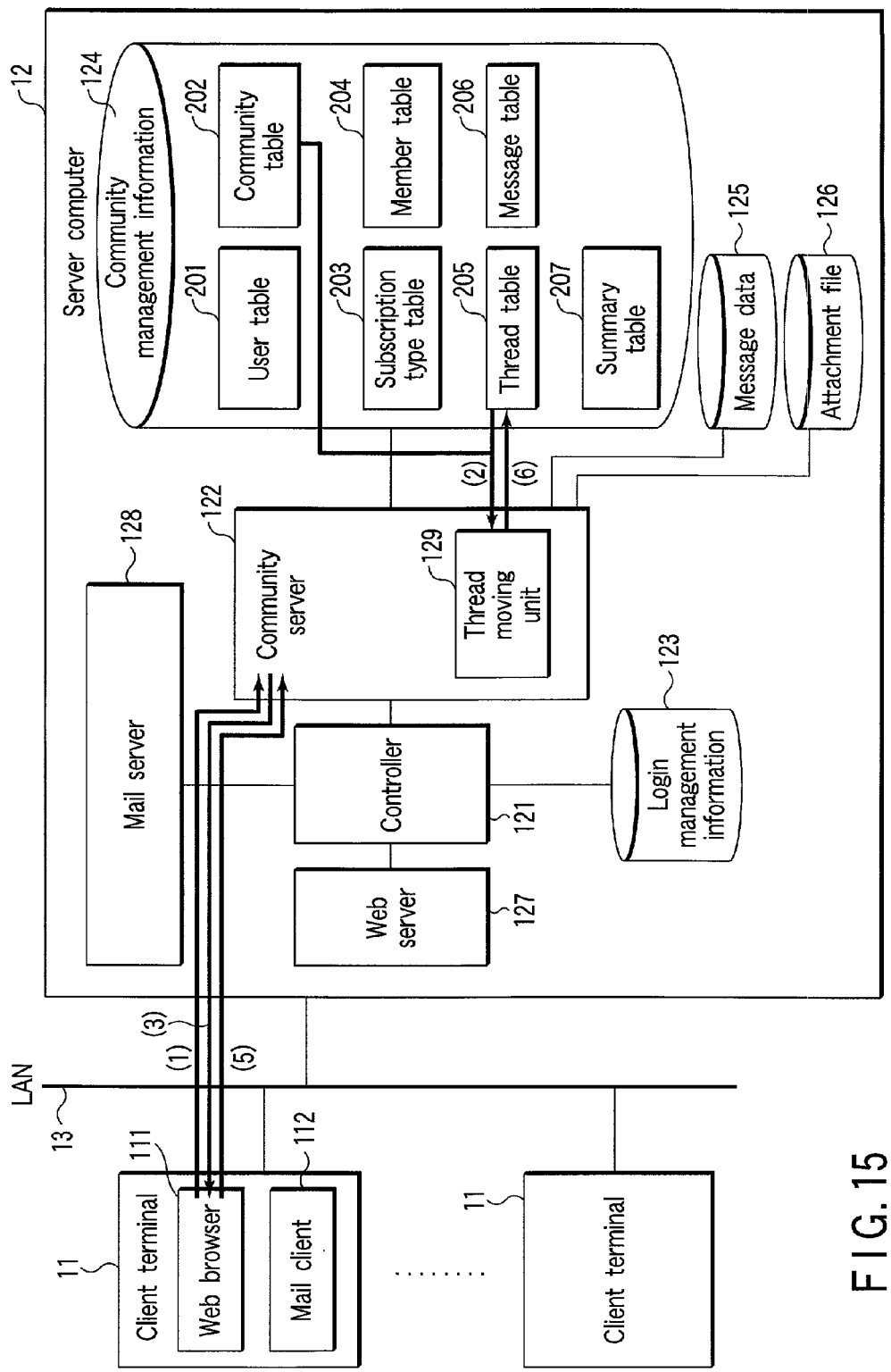
FIG. 15 is a diagram showing the flow of a thread moving process in the community-based collaborative knowledge system of this embodiment.

FIG. 15 shows the flow of the thread moving process between communities shown in FIGS. 13A and 13B or FIGS. 14A and 14B.

When the Web browser 111 designates an URL for the thread moving process with respect to the community server 122 (1), the thread moving unit 129 of the community server 122 searches the community table 202 and thread table 205 of the community management information 124 for communities and threads that allow movement access (2), and returns them to the Web browser 111 (3). Communities as the source and destination, and the moving method are selected on the displayed window (4), and the selection result is sent as movement instruction information to the thread moving unit 129 of the community server 122 (5). Upon receiving the instruction, the thread moving unit 129 updates the thread table 205 of the community management information 124 to move threads (6). In case of "batch movement", the unit 129 also executes an update process of the community table 202 for member movement.

Figure 16:
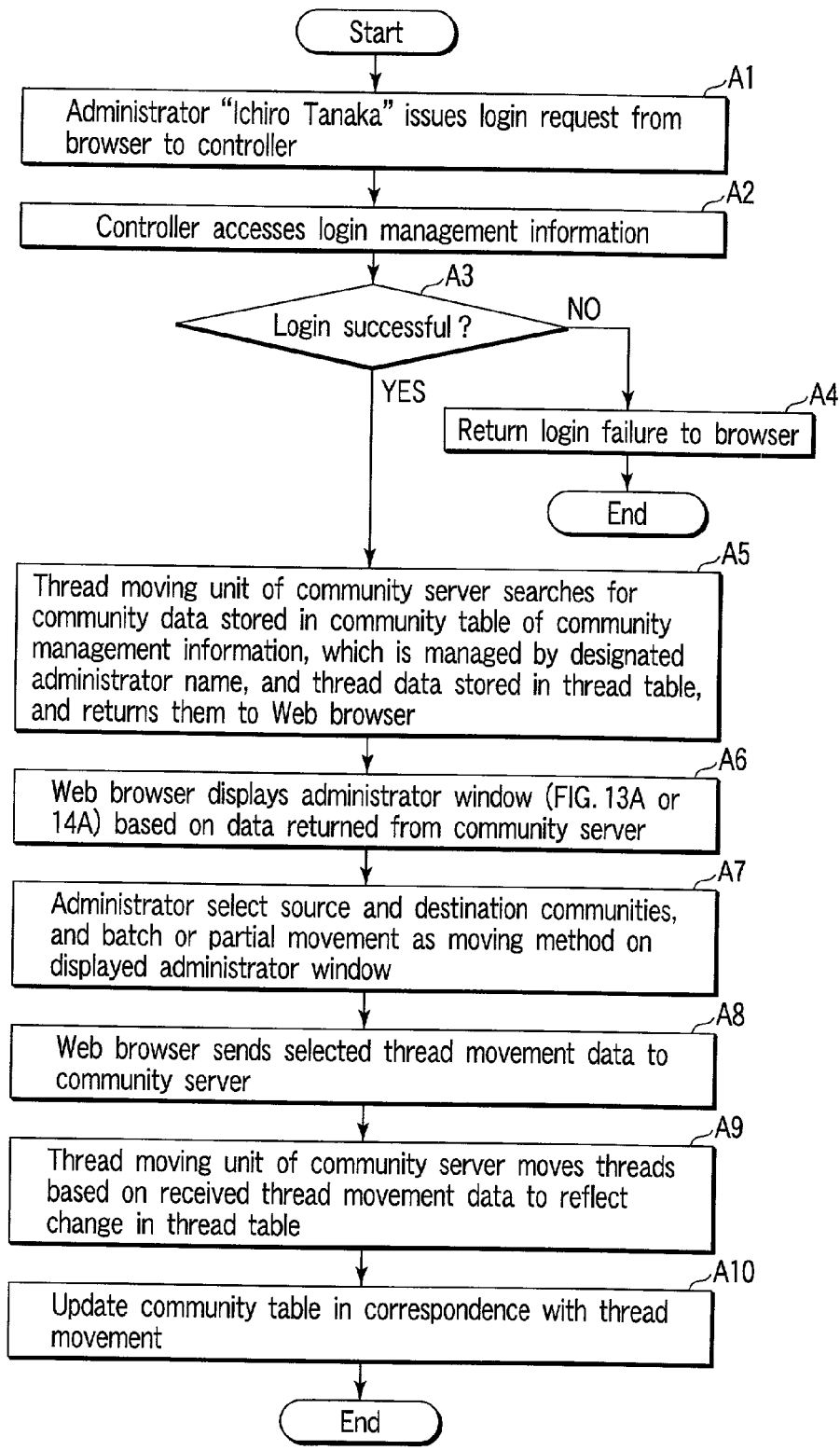
FIG. 16 is a flow chart showing the sequence of the thread moving process in the community-based collaborative knowledge system of this embodiment.

FIG. 16 is a flow chart showing the sequence of the thread moving process shown in FIG. 15.

If the administrator "Ichiro Tanaka" issues a login request to the controller 121 of the server computer 12 (step A1), the controller 121 accesses the login management information 123 (step A2) to check if the user ID and password input from that user are registered, and makes user authentication (step A3) to determine if that login access is permitted. If the user ID and password are not registered in the login management information 123 and the login access has failed (NO in step A3), the controller 121 returns a login failure to the Web browser 111 via the Web server 127 and ends this process (step A4).

On the other hand, if the user ID and password are registered in the login management information 123 and the login access has succeeded (YES in step A3), the thread moving unit 129 of the community server 122 searches for community data stored in the community table 202 of the community management information 124, which is managed by the designated administrator name, and thread data stored in the thread table 205, and returns them to the Web browser 111 (step A5).

If the Web browser 111 displays a thread movement access window for the administrator shown in FIG. 13A or 14A on the basis of the data returned from the community server 122 (step A6), the administrator selects communities as the source and destination, and also "batch movement" or "partial movement" as the moving method on the displayed administrator window (step A7). If the Web server 111 sends the selected thread movement data to the community server 122 (step A8), the thread moving unit 129 of the community server 122 moves threads based on the received thread movement data to reflect changes in the thread table 205 (step A9). In case of "batch movement", a member ID list update process of the community table 202 is executed so that members who participate in the source community can be those of the destination community (step A10).

As described above, since this community-based collaborative knowledge system has the mechanism for moving a thread as a set of messages posted to a given virtual community to another virtual community, each user can utilize collected and accumulated knowledge via his or her desired interface. Since an administrator can move a thread between communities, virtual communities can be combined or divided.

More specifically, communities can be combined when all threads in one community are moved to another community, and the empty community is then deleted automatically or in accordance with an administrator's instruction. On the other hand, a community can be divided when the administrator creates a new community, and moves a plurality of desired threads from another community that already contains threads to the new community.

Since all the functions of the community-based collaborative knowledge system of this embodiment are implemented by computer programs, these computer programs are stored in a computer-readable storage medium, and are installed in a normal computer, which can be connected to a computer network, via the storage medium, thus obtaining the same effects as in this embodiment.

The present invention is not limited to the aforementioned embodiment, and various modifications may be made without departing from the scope of the invention when it is practiced. Furthermore, the embodiment includes inventions of various stages, and various inventions can be extracted by appropriately combining a plurality of required constituent elements disclosed in this application. For example, even when some required constituent elements are deleted from all the required constituent elements disclosed in the embodiment, an arrangement from which those required constituent elements are deleted can be extracted as an invention if the effect of the present invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A community-based collaborative knowledge system which can be connected to a plurality of client terminals via a network, and supports knowledge accumulation by categorizing and accumulating messages posted from each client terminal to a virtual community, comprising:
   access control means for making user authentication of a client terminal as an access request source so as to permit the client terminal to post a message; and
   community processing means for managing a plurality of virtual communities in each of which a plurality of client terminals can participate, and categorizing and accumulating messages posted, to each virtual community, from the client terminals, which are granted access permission by said access control means, for respective topics, said community processing means including message moving means for moving the categorized and accumulated messages between the virtual communities in accordance with an instruction from an administrator.

2. A system according to claim 1, wherein all messages in at least one source virtual community designated by the administrator are batch-moved to a destination virtual community designated by the administrator, and the at least one source community is then deleted to combine the virtual communities.

3. A system according to claim 2, wherein said community processing means includes:
   means for storing community management information used to manage members who participate in each virtual community; and
   means for updating the community management information to make members who participate in the source community become members of the destination community after batch movement of messages by said message moving means.

4. A system according to claim 1, wherein said message moving means moves some of messages in the source virtual community designated by the administrator to at least one new virtual community created by the administrator so as to divide the virtual community.

5. A system according to claim 1, wherein said community processing means has at least a community table for storing community data associated with virtual communities, and a thread table for storing thread data associated with threads as sets of messages posted to the virtual communities,
   said message moving means comprises:
   means for searching the community table and the thread table in response to an instruction from a client terminal of an administrator, and sending community data managed by the administrator and corresponding thread data to the client terminal of the administrator;
   means for receiving thread movement data, which designates source and destination communities, and some or all thread data of the source community, which are input at the client terminal of the administrator; and
   means for moving the thread data on the basis of the thread movement data to reflect a change in the thread table, and updating a member list of the community data in correspondence with the thread movement.

6. A message moving method in a community-based collaborative knowledge system which can be connected to a plurality of client terminals via a network, and supports knowledge accumulation by categorizing and accumulating messages posted from each client terminal to a virtual community, comprising:
   the access control step of making user authentication of a client terminal as an access request source so as to permit the client terminal to post a message; and
   the community processing step of managing a plurality of virtual communities in each of which a plurality of client terminals can participate, and categorizing and accumulating messages posted, to each virtual community, from the client terminals, which are granted access permission in the access control step, for respective topics; and
   the message moving step of moving the categorized and accumulated messages between the virtual communities in accordance with an instruction from an administrator.

7. A method according to claim 6, wherein all messages in at least one source virtual community designated by the administrator are batch-moved to a destination virtual community designated by the administrator, and the at least one source community is then deleted to combine the virtual communities.

8. A method according to claim 7, further comprising the step of updating community management information used to manage members who participate in each virtual community, so as to make members who participate in the source community become members of the destination community after batch movement of messages in the message moving step.

9. A method according to claim 6, wherein the message moving step includes the step of moving some of messages in the source virtual community designated by the administrator to at least one new virtual community created by the administrator so as to divide the virtual community.

10. A method according to claim 6, wherein the message moving step comprises:

the step of searching a community table for storing community data associated with virtual communities, and a thread table for storing thread data associated with threads as sets of messages posted to the virtual communities, in response to an instruction from a client terminal of an administrator, and sending community data managed by the administrator and corresponding thread data to the client terminal of the administrator;

the step of receiving thread movement data, which designates source and destination communities, and some or all thread data of the source community, which are input at the client terminal of the administrator; and the step of moving the thread data on the basis of the thread movement data to reflect a change in the thread table, and updating a member list of community data in correspondence with the thread movement.

11. A program used in a community-based collaborative knowledge system which can be connected to a plurality of client terminals via a network, and supports knowledge accumulation by categorizing and accumulating messages posted from each client terminal to a virtual community, said program making a computer execute:

the access control step of making user authentication of a client terminal as an access request source so as to permit the client terminal to post a message; and the community processing step of managing a plurality of virtual communities in each of which a plurality of client terminals can participate, and categorizing and accumulating messages posted, to each virtual community, from the client terminals, which are granted access permission in the access control step, for respective topics; and the message moving step of moving the categorized and accumulated messages between the virtual communities in accordance with an instruction from an administrator.

12. A program according to claim 11, wherein all messages in at least one source virtual community designated by the administrator are batch-moved to a destination virtual community designated by the administrator, and the at least one source community is then deleted to combine the virtual communities.

13. A program according to claim 12, further comprising the step of updating community management information used to manage members who participate in each virtual community, so as to make members who participate in the source community become members of the destination community after batch movement of messages in the message moving step.

14. A program according to claim 11, wherein the message moving step includes the step of moving some of messages in the source virtual community designated by the administrator to at least one new virtual community created by the administrator so as to divide the virtual community.

15. A program according to claim 11, wherein the message moving step comprises:

the step of searching a community table for storing community data associated with virtual communities, and a thread table for storing thread data associated with threads as sets of messages posted to the virtual communities, in response to an instruction from a client terminal of an administrator, and sending community data managed by the administrator and corresponding thread data to the client terminal of the administrator;

the step of receiving thread movement data, which designates source and destination communities, and some or all thread data of the source community, which are input at the client terminal of the administrator; and the step of moving the thread data on the basis of the thread movement data to reflect a change in the thread table, and updating a member list of community data in correspondence with the thread movement.

* * * * *